(12) United States Patent
Sander et al.

(10) Patent No.: US 11,356,484 B2
(45) Date of Patent: Jun. 7, 2022

(54) STRENGTH OF ASSOCIATIONS AMONG DATA RECORDS IN A SECURITY INFORMATION SHARING PLATFORM

(71) Applicant: ENTIT SOFTWARE LLC, Sanford, NC (US)

(72) Inventors: Tomas Sander, Princeton, NJ (US); Brian Frederik Hosea Che Hein, Aliso Viejo, CA (US); Nadav Cohen, Sunnyvale, CA (US); Ted Ross, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 509 days.

(21) Appl. No.: 16/077,233

(22) PCT Filed: Feb. 12, 2016

(86) PCT No.: PCT/US2016/017835
§ 371 (c)(1),
(2) Date: Aug. 10, 2018

(87) PCT Pub. No.: WO2017/138958
PCT Pub. Date: Aug. 17, 2017

(65) Prior Publication Data
US 2019/0028516 A1 Jan. 24, 2019

(51) Int. Cl.
*G06F 21/57* (2013.01)
*H04L 9/40* (2022.01)
(Continued)

(52) U.S. Cl.
CPC .......... *H04L 63/205* (2013.01); *G06F 16/285* (2019.01); *G06F 21/56* (2013.01);
(Continued)

(58) Field of Classification Search
CPC ..... H04L 63/205; G06F 16/285; G06F 21/56; G06F 21/57; G06F 21/6218
(Continued)

(56) References Cited

U.S. PATENT DOCUMENTS 7,949,716 B2  5/2011  Alperovitch et al.
9,015,843 B2  4/2015  Griffin et al.
(Continued)

FOREIGN PATENT DOCUMENTS

EP          2911078 A2    8/2015
WO    WO-2014138115 A1   9/2014

OTHER PUBLICATIONS

Cyber Squared, Inc., Threat Intelligence Platforms: Everything You've Ever Wanted to Know but Didn't Know to Ask, Jun. 23, 2015, 51 pages.
(Continued)

*Primary Examiner* — Dereena T Cattungal

(57) ABSTRACT

Examples disclosed herein relate to strength of associations among data records in a security information sharing platform. Some examples may enable creating, in the security information sharing platform, an association between a security indicator comprising an observable, and a data record. Some examples may further enable determining strength of the association between the security indicator and the data record based on at least one of: a likelihood of change in the association; a creator of the association; an aging rate of the association; or a quality of evidence that supports the association.

20 Claims, 5 Drawing Sheets

(51) Int. Cl.
*G06F 21/62* (2013.01)
*G06F 16/28* (2019.01)
*G06F 21/56* (2013.01)
*H04L 9/06* (2006.01)

(52) U.S. Cl.
CPC .......... *G06F 21/57* (2013.01); *G06F 21/6218* (2013.01); *H04L 9/0643* (2013.01); *H04L 63/145* (2013.01); *H04L 63/1416* (2013.01); *H04L 63/1433* (2013.01); *H04L 63/104* (2013.01)

(58) Field of Classification Search
USPC .......................................................... 726/22
See application file for complete search history.

(56) References Cited

U.S. PATENT DOCUMENTS

| | | | |
|---|---|---|---|
| 9,015,846 | B2 | 4/2015 | Watters et al. |
| 9,098,699 | B1 | 8/2015 | Zaslavsky et al. |
| 10,262,136 | B1* | 4/2019 | Kailash ............... H04L 63/1416 |
| 2009/0024663 | A1 | 1/2009 | McGovern |
| 2009/0307755 | A1* | 12/2009 | Dvorak .................. G16H 10/60 726/4 |
| 2013/0145471 | A1* | 6/2013 | Richard ................ G06F 21/562 726/24 |
| 2014/0007190 | A1* | 1/2014 | Alperovitch ........ H04L 63/1441 726/3 |
| 2015/0207813 | A1* | 7/2015 | Reybok ................. H04L 63/145 726/22 |
| 2015/0222656 | A1* | 8/2015 | Haugsnes ........... H04L 63/1441 726/23 |
| 2015/0281951 | A1 | 10/2015 | Geng |
| 2016/0162690 | A1* | 6/2016 | Reith .................... G06F 21/577 726/25 |
| 2016/0164905 | A1* | 6/2016 | Pinney Wood ....... G06F 21/577 726/25 |
| 2016/0248799 | A1* | 8/2016 | Ng ....................... H04L 63/1433 |
| 2017/0078321 | A1* | 3/2017 | Maylor .................... H04L 51/12 |
| 2017/0171231 | A1* | 6/2017 | Reybok, Jr. ............. H04L 63/06 |
| 2017/0180378 | A1* | 6/2017 | Tyler ...................... H04L 63/083 |
| 2017/0187742 | A1* | 6/2017 | Rogers .................... H04L 63/20 |
| 2018/0191730 | A1* | 7/2018 | Deters .................. G06F 16/285 |
| 2018/0191781 | A1* | 7/2018 | Palani ................... G06F 21/554 |
| 2019/0173893 | A1* | 6/2019 | Muddu ................. G06F 3/0482 |

OTHER PUBLICATIONS

International Searching Authority, International Search Report & Written Opinion for Application No. PCT/US2016/017835, Nov. 7, 2016, 14 pages.
Threatconnect, Inc., Threatconnect Capabilities, Jul. 13, 2014, 7 pages.
TM Forum, Sharing Threat Intelligence to Mitigate Cyber Attacks, Nov. 2013, 29 pages.
Yu, S., et al., Attribute-Based on-Demand Multicase Group Setup with Membership Anonymity, SecureGomm 2008, Sep. 22-25, 2008, 6 pages.

* cited by examiner

STRENGTH OF ASSOCIATIONS AMONG DATA RECORDS IN A SECURITY INFORMATION SHARING PLATFORM

BACKGROUND

Users of a security information sharing platform share security information (e.g., security indicators, observables, threat actors, malware samples, chains of attack, attack campaigns, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
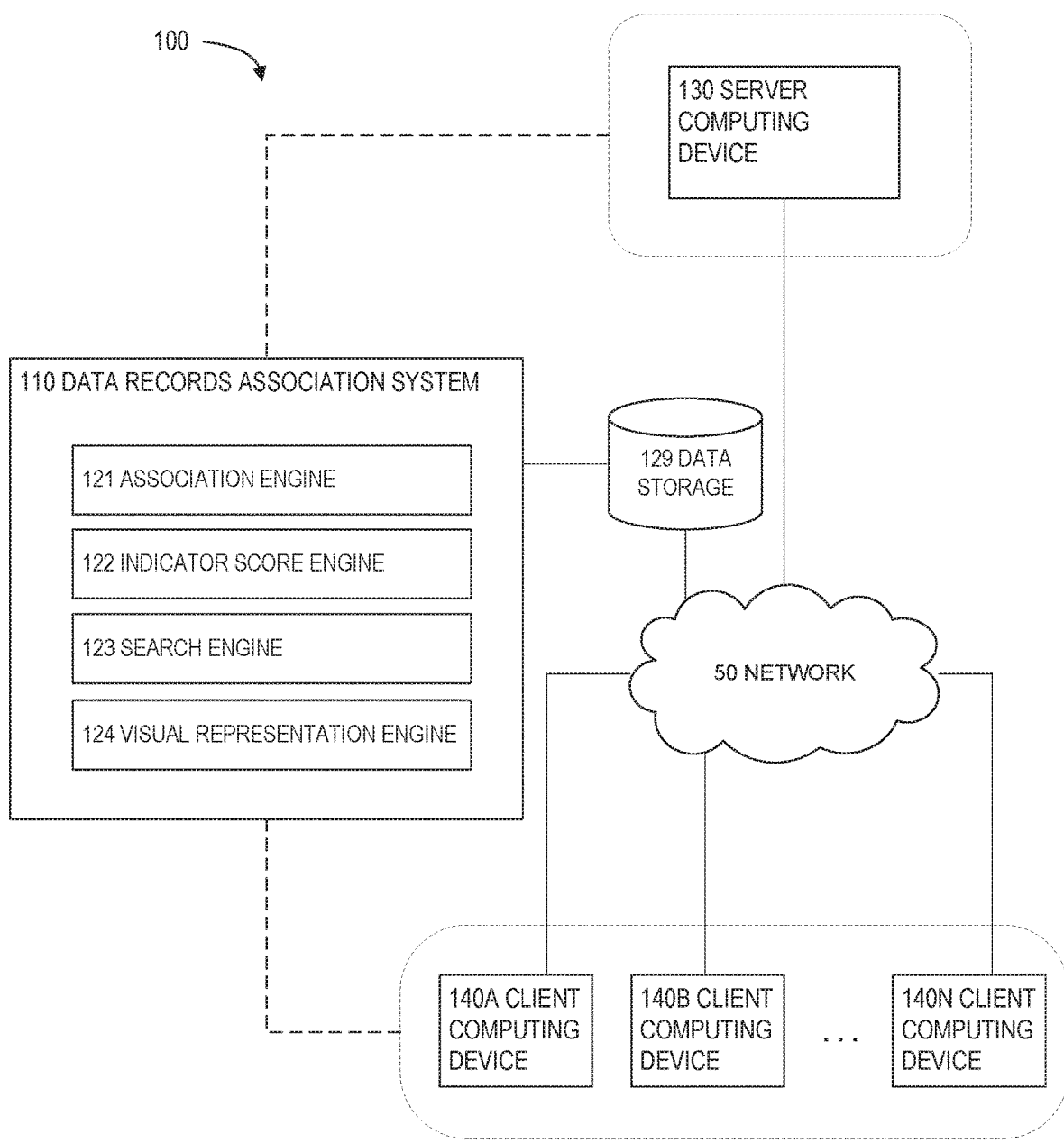
FIG. 1 is a block diagram depicting an example environment in which various examples may be implemented as a data records association system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security information (e.g., security indicators, observables, threat actors, malware samples, chains of attack, attack campaigns, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds and/or any other participating organizations. A security indicator that is found in the intelligence feeds and/or information from other participating organizations, for example, may be automatically created and/or added to the security information sharing platform, There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria. Other examples of source entities may include but not be limited to government sources and open source feeds.

As more security indicators are gathered from various source entities and added to the security information sharing platform, the security information sharing platform would become a rich source of threat intelligence information itself. To maximize the richness of threat intelligence information gathered by the platform, it may be important to define appropriate associations and/or relationships among various data records resided in the security information sharing platform, which can be a time-consuming and technically challenging task. In addition, the strength of associations may vary, and determining appropriate strength for individual associations may add another layer of complexity.

Examples disclosed herein provide solutions to these challenges by providing a technique to create associations among data records in the security information sharing platform, and determine strength of the associations based on various parameters (e.g., a likelihood of change in an association, a creator of the association, an aging rate of the association, a quality of evidence that supports the association, etc.). This would allow, for example, an analyst to mine and interactively traverse the intelligence data of the platform, leveraging the associations and/or relationships (and/or strengths thereof) defined among the data records. As a result, the security information sharing platform may provide important tactical and strategic information to the analyst (e.g., about which threat actors may be attacking his/her organizations and which security indicators the analyst should look for in his/her infrastructure).

Some examples may enable creating, in the security information sharing platform, an association between a security indicator comprising an observable, and a data record. Some examples may further enable determining strength of the association between the security indicator and the data record based on at least one of: a likelihood of change in the association; a creator of the association; an aging rate of the association; and a quality of evidence that supports the association.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on, FIG. 1 is an example environment 100 in which various examples may be implemented as a data records association system 110. Data records association system 110 may include a server computing device in communication with client computing devices via a network 50. The client computing devices may communicate requests to and/or receive responses from the server computing device. The server computing device may receive and/or respond to requests from the client computing devices. The client computing devices may be any type of computing device providing a user interface through which a user can interact with a software application. For example, the client computing devices may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While the server computing device can be a single computing device, the server computing device may include any number of integrated or distributed computing devices.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, data records association system 110 and the various components described herein may be implemented in hardware and/or a combination of hardware and programming that configures hardware. Furthermore, in FIG. 1 and other Figures described herein, different numbers of components or entities than depicted may be used.

Data records association system 110 may comprise an association engine 121, an indicator score engine 122, a search engine 123, a visual representation engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Association engine 121 may create, in a security information sharing platform, associations and/or relationships among various data records in a security information sharing platform. As discussed above, the security information sharing platform may enable sharing of security information (e.g., security indicators, observables, threat actors, malware samples, chains of attack, attack campaigns, etc.) among a plurality of users and/or a plurality of communities. For example, a particular security indicator may be associated another data record such as an observable, another security indicator, a threat actor, a malware (e.g., or sample thereof), a chain of attack, an organization, an industry sector, a community, a domain name, an indicator score for the particular security indicator, a source entity, a level of confidence (e.g., the level of confidence that the indicator is actually malicious and/or accurate), a level of severity (e.g., the level of severity that the indicator may pose), and/or a sighting of an observable of the particular security indicator. Note that any associations created by association engine 121 may be modified and/or removed at any given time.

Such associations among different data records resided in the security information sharing platform may be created in various ways:

In some implementations, association engine 121 may create an association between the particular security indicator (and/or an observable therein) and a data record based on user input. For example, as a user submits the particular security indicator to the platform, the user (or another user) may choose to share other information that the user has regarding the indicator. The user who has the knowledge about a threat actor behind the security threat posed by the particular security indicator may create the association between the particular security indicator and the data record that corresponds to that threat actor using the platform.

In some implementations, association engine 121 may create an association between the particular security indicator (and/or an observable therein) and a data record based on whether the data record is created in the same case as the particular security indicator (and/or an observable therein). For example, a user may open a new case in the security information sharing platform and submit 3 security indicators that are related to this new case. This may cause association engine 121 to create the associations between these 3 indicators and/or observables therein.

In some implementations, association engine 121 may create an association between the particular security indicator (and/or an observable therein) and a data record based on external data (e.g., data external to the security information sharing platform). In one example, domain name service (DNS) data (e.g., passive DNS data) may include an IP address (e.g., an observable) associated with a particular domain name (e.g., internic.net), a particular registrar (e.g., ABC Registrar, Inc.), a particular nameserver (e.g., NS.EXAMPLE.COM), etc. Association engine 121 may identify a data record corresponding to the particular domain name in the security information sharing platform and may create an association between the particular security indicator having that IP address and the data record corresponding to the particular domain name. In another example, threat intelligence feeds may be used to identify data records that may be associated with the particular security indicator. In many cases, the threat intelligence feeds may include the information related to a threat actor, a severity, an organization, an industry sector, etc. with respect to individual security indicators in the feeds. Association engine 121 may refer to the threat intelligence feeds to create appropriate associations between the particular security indicator and a data record corresponding to the threat actor, severity, organization, industry sector, etc. as identified in the threat intelligence feeds.

In some implementations, association engine 121 may create an association between the particular security indicator (and/or an observable therein) and a data record (e.g., malware sample) based on an automated malware analysis. The automated malware analysis may, for example, build a mapping of IP address, domains, registry changes, and/or other security indicators to a specific malware sample (e.g., each sample may be identified a corresponding malware identifier). Based on this analysis, association engine 121 may create appropriate associations between indicators (and/or the observables therein) and the malware samples. In some situations, different malware samples may be clustered (e.g., associated by association engine 121) to create a malware cluster if the analysis determines that those malware samples are sufficiently similar (e.g., a common author, similar codes, similar observables, etc.).

In some implementations, association engine 121 may create an association between the particular security indicator (and/or an observable therein) and a data record based on information related to a chain of an attack (or also known as a cyber kill chain). A chain of an attack describes multiple stages of a security attack. For example, an attacker (or threat actor) may send a malware to a victim by email or other means in a first stage. The malware may be installed on a computer by the victim in a second stage. In a third stage, the attacker may perform the steps to achieve his goals inside the victim's network. Using this example, if the particular security indicator is associated with a particular threat actor, the above described kill chain involving the same threat actor may be also associated with the particular security indicator. For example, a data record corresponding to the malware sample identified in the kill chain may be associated with the particular security indicator by association engine 121.

In some implementations, association engine 121 may create an association between the particular security indicator (that comprises an observable) and a data record based on sightings of that observable. For example, the sightings may represent a number (e.g., count) of sightings of the observable by at least one source entity associated with the data record. In other words, it may indicate the number of times that the observable has been observed by at least one source entity. The security information sharing platform may keep track of information related to sightings of an observable. The platform may obtain from a source entity, a sighting of an observable. The sighting of the observable may indicate that the observable has been observed by the source entity. For example, the source entity may detect a certain IP address (e.g., the observable) in its network traffic, and add the observable to the security information sharing platform. This addition of the observable may be considered as a single sighting of the observable. In some instances, when two individuals working for the same organization add the same observable to the platform, the platform may treat these additions as a single sighting of the observable or as two separate sightings of the observable. In another example, when the IP address (e.g., the observable) is found in the threat intelligence feeds provided by a particular threat intelligence provider, this observable may be added to the security information sharing platform as a single sighting of this observable. When two different sets of threat intelligence feeds provided by two different providers include the same observable, the observable may be added as two sightings of the observable.

For example, the data record may represent a group that a source entity belongs to such as an organization (e.g., a bank), an industry sector (e.g., financial services), a geography, and/or a community (e.g., of the security information sharing platform). Consider the following scenario: the particular security indicator having the observable was initially submitted by a user of a first group (e.g., a first community). The security information sharing platform learns that that same observable has been sighted (e.g., observed) by at least one user of a second group (e.g., a second community) for a number of times. Association engine 121 may create an association between the particular security indicator and the second group if the number of sightings (e.g., the number of all of sightings that have been reported so far, the number of sightings over a particular time period, a frequency of sightings, etc.) by users of the second group exceeds a predetermined threshold value. For example, if a total number of sightings by users of the second group equals 8 where the predetermined threshold value has been set to be 7, the association between the particular security indicator and the second group may be created.

Association engine 121 may determine strength of an association (e.g., that has been created as discussed above) based on various parameters. In other words, the strength of each association may vary based on the parameters including, but are not limited to: (1) a likelihood of change in the association, (2) a creator and/or verifier of the association, (3) an aging rate of the association, and (4) a quality of evidence that supports the association. Each of the above example parameters is further discussed below.

(1) A likelihood of change in the association: A likelihood of change in the association may depend on the volatility and/or expected life of the data record(s) that are connected by the association. For example, the strength of some associations tend to decrease quicker (e.g., the associations between IP addresses and domain names). The association between an IP address and a domain name may remain unchanged for a short period of time because an IP address tends to change quickly over time. On the other hand, associations, such as an association between a threat actor and the threat actor's preferred tactics, techniques, and procedures (TTPs) is less likely to change over time. Thus, a first association (e.g., the association between a threat actor and its TTPs) having a lower likelihood of change may be increased in its strength by a higher percentage than a second association (e.g., the association between an IP address and a domain name) having a higher likelihood of change.

(2) A creator and/or verifier of the association: Association engine 121 may determine whether the association was created (and/or verified) by a user of the platform, a trusted third-party entity, and/or automatically created by the platform itself. For example, the association created and/or verified by a user of the platform or a trusted third-party entity may be given a higher strength than the association that was automatically computed or otherwise created by the platform. In some cases, a community of users may collaborate on a case on the platform. One user may create the association while another user can verify the association. This verification process may increase the strength of the association.

(3) An aging rate of the association: An aging rate may indicate a rate of reduction in the strength of the association over a certain time period. For example, if the predetermined time period has passed since the creation (and/or the last modification) of the association, association engine 121 may apply the aging rate to the strength of the association, reducing the strength by an amount defined by the aging rate. This makes sense because recent associations are more likely to be still accurate and therefore should be assigned a higher strength.

(4) A quality of evidence that supports the association: By taking the quality of evidence into consideration, erroneous conclusions based on faked or spurious associations could be avoided. For example, two different files can be easily named identically to avoid detection, Although an association could have been created between these two files based on having the same file name, the strength of this association should be relatively low because of a low evidence quality of the file name. On the other hand, the hash value of a given file characterizes the file uniquely and thus provides strong evidence that two files with the same hash value actually refer to the same file, Thus, a first association between the two files having the same hash value may be given a higher strength than a second association between the two files sharing the same file name. In another example, an association between two emails can be created based on the two emails sharing the same subject line. The strength of this association should be lower than the strength of an association between the two emails having information about mail servers used in delivering those emails.

Note that the strength of the association may be dynamically adjusted as any of the parameters change. In some cases, the strength may be adjusted manually based on user input. As the strength is adjusted, scores (including an indicator score as discussed herein with respect to indicator score engine 122) for any of the data records being connected by the association may be also adjusted or otherwise updated. Further, a change in the strength of a first association between a first data record and a second data record may influence a score for a third data record that is connected to the second data record via a second association. Similarly, the change in the strength of the first association may further influence a score for a fourth data record that is connected to the third data record via a third association, and so forth.

Indicator score engine 122 may determine an indicator score for a data record comprising a security indicator (e.g., the security indicator comprising at least one observable) based on various parameters including, but not being limited to: a severity of a security threat posed by the security indicator (e.g., a higher level of severity may result in a higher indicator score), a number of sightings of the observable (e.g., an indication that the observable is sighted and/or observed may positively influence the indicator score. The technique to determine the number of the sightings of an observable is discussed herein with respect to association engine 121), a reliability of a source entity for the security indicator (e.g., if the security indicator is provided by a reliable source entity, it may result in a higher indicator score), user feedback indicating whether the security indicator is malicious and/or accurate submitted by users of the security information sharing platform (e.g., the platform users may help determine the accuracy of the security indicator. A large number of votes validating the accuracy of the indicator may result in a higher indicator score), and the associations created between the data record and other data records (and/or strengths thereof).

For example, a higher strength of a first association between a first data record (e.g., comprising a security indicator) and a second data record may result in a higher indicator score for the security indicator. As the strength of the first association is changed based on any of the parameters as discussed herein with respect to association engine 121, the indicator score for the security indicator may also re-determined or otherwise adjusted. Further, a change in the strength of the first association may influence a score for a third data record that is connected to the second data record via a second association. Similarly, the change in the strength of the first association may further influence a score for a fourth data record that is connected to the third data record via a third association, and so forth.

In some implementations, a recommendation and/or a recommended action may be generated or otherwise provided based on the indicator score (e.g., as discussed herein with respect to indicator score engine 122) of the security indicator. For example, if the indicator score is below a first threshold value, the indicator can be continued to be monitored without any further action. If the indicator score is above the first threshold value but below a second threshold value, the recommendation may be generated to inform at least one user to perform a further investigation on the security indicator. If the indicator score is above a third threshold value, the indicator may be considered to be malicious and/or accurate that could pose an actual security threat. In this case, any event that matches this security indicator may be blocked from accessing certain resources.

Search engine 123 may obtain a search query (e.g., the search query may be submitted by a user of the security information sharing platform), In some implementations, the search query may specify a particular security indicator that a user may want to find more information about. In response to the search query, search engine 123 may identify a set of data records that satisfy the search query. The set of data records may be the records that have associations with the particular security indicator (e.g., associations created by association engine 121). Returning to the above example, the search based on the particular security indicator may return the second group and/or any information that may be associated with the second group. For example, the security indicators that have been created and/or submitted by the users of the second group may be returned in response to the search query. Other associated data records such as malware samples, other observables, threat actors, etc. may also be returned as part of the search results.

Visual representation engine 124 may create or otherwise provide a visual representation of the associations created by association engine 121. In some implementations, visual representation engine 124 may provide a visual representation of associations between the particular security indicator and the set of data records that satisfy the search query (e.g., that specified the particular security indicator). In some instances, a visual representation may show data records as nodes and associations between the data records as edges. For example, a particular security indicator may be shown in the visual representation as a first node while an associated data record (e.g., a malware sample) may be shown as a second node. The association between the particular security indicator and the associated data record may be depicted as an edge in the visual representation. A user may zoom in and/or out of the visual representation to see a specific part of the representation, and may be given an option to drill down each node to review a summary of that node (e.g., a creation or modified time of the corresponding data record, a source entity that created and/or submitted the corresponding data record, etc.). The edges may be shown visually different from each other based on the strength of the associations (e.g., as discussed herein with respect to association engine 121). For example, a first edge may be shown shorter than a second edge if the association represented by the first edge is stronger that the association represented by the second edge. In another example, the first edge may be shown thicker than the second edge.

In performing their respective functions, engines 121-124 may access data storage 129 and/or other suitable database(s). Data storage 129 may represent any memory accessible to data records association system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Data records association system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
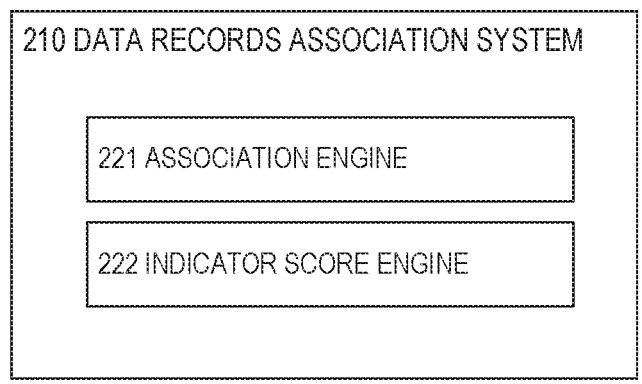
FIG. 2 is a block diagram depicting an example data records association system.

FIG. 2 is a block diagram depicting an example data records association system 210. Data records association system 210 may comprise an association engine 221, and an indicator score engine 222, and/or other engines. Engines 221-222 represent engines 121-122, respectively.

Figure 3:
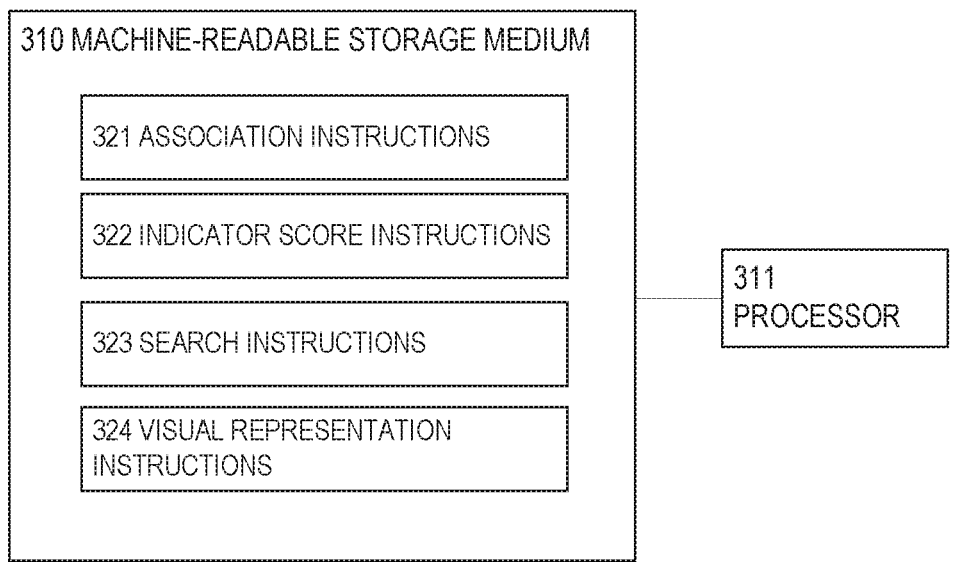
FIG. 3 is a block diagram depicting an example machine-readable storage medium comprising instructions executable by a processor for determining strength of associations among data records in a security information sharing platform.

FIG. 3 is a block diagram depicting an example machine-readable storage medium 310 comprising instructions executable by a processor for determining strength of associations among data records in a security information sharing platform.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements data records association system 110 of FIG. 1.

In FIG. 3, the executable program instructions in machine-readable storage medium 310 are depicted as association instructions 321, indicator score instructions 322, search instructions 323, and visual representation instructions 324. Instructions 321-324 represent program instructions that, when executed, cause processor 311 to implement engines 121-124, respectively.

Figure 4:
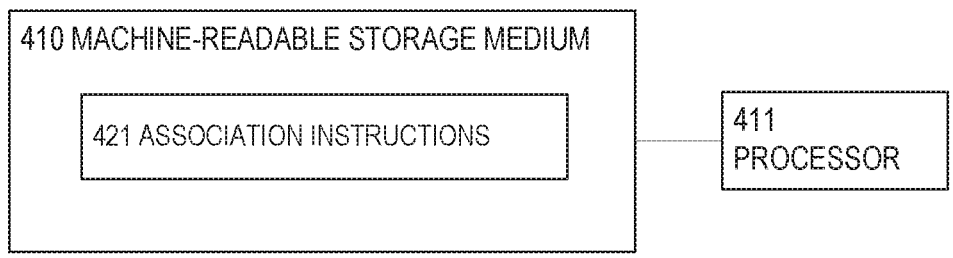
FIG. 4 is a block diagram depicting an example machine-readable storage medium comprising instructions executable by a processor for determining strength of associations among data records in a security information sharing platform.

FIG. 4 is a block diagram depicting an example machine-readable storage medium 410 comprising instructions executable by a processor for determining strength of associations among data records in a security information sharing platform.

Referring to FIG. 4, the programming may be processor executable instructions 421 stored on a machine-readable storage medium 410 and the hardware may include a processor 411 for executing those instructions. Thus, machine-readable storage medium 410 can be said to store program instructions or code that when executed by processor 411 implements data records association system 110 of FIG. 1.

In FIG. 4, the executable program instructions in machine-readable storage medium 410 are depicted as association instructions 421. Instructions 421 represent program instructions that, when executed, cause processor 411 to implement engine 121, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement data records association system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421, and/or other instructions. As an alternative or in addition to retrieving and executing instructions, processor 411 may include at least one electronic circuit comprising a number of electronic components for performing the functionality of at least one of instructions 421, and/or other instructions.

Figure 5:
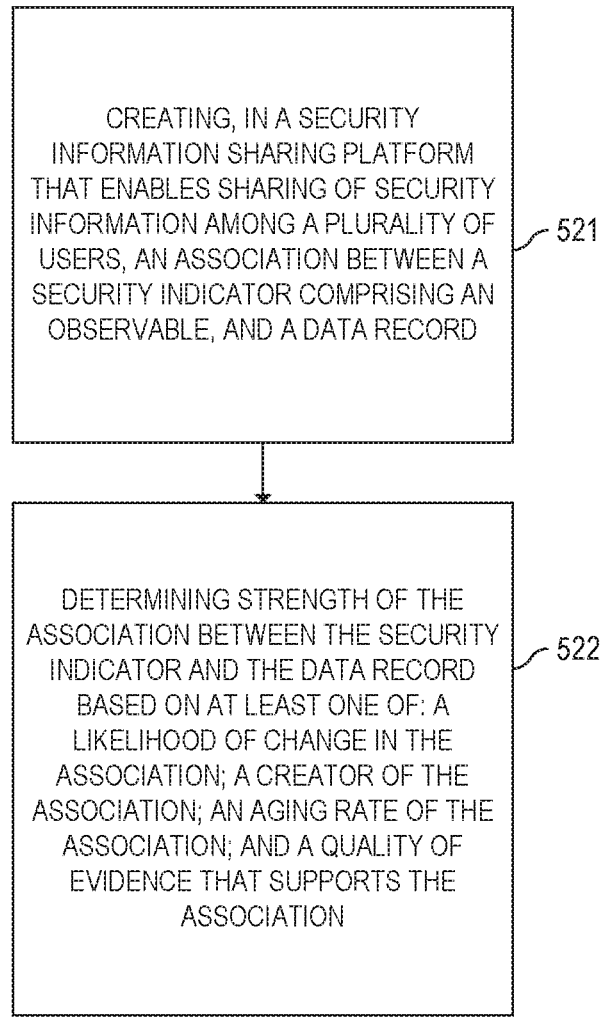
FIG. 5 is a flow diagram depicting an example method for determining strength of associations among data records in a security information sharing platform.

FIG. 5 is a flow diagram depicting an example method 500 for determining strength of associations among data records in a security information sharing platform. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams, Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include creating, in a security information sharing platform that enables sharing of security information among a plurality of users, an association between a security indicator comprising an observable, and a data record. Referring back to FIG. 1, association engine 121 may be responsible for implementing block 521.

In block 522, method 500 may include determining strength of the association between the security indicator and the data record based on at least one of: a likelihood of change in the association; a creator of the association; an aging rate of the association; or a quality of evidence that supports the association. Referring back to FIG. 1, association engine 121 may be responsible for implementing block 522.

Figure 6:
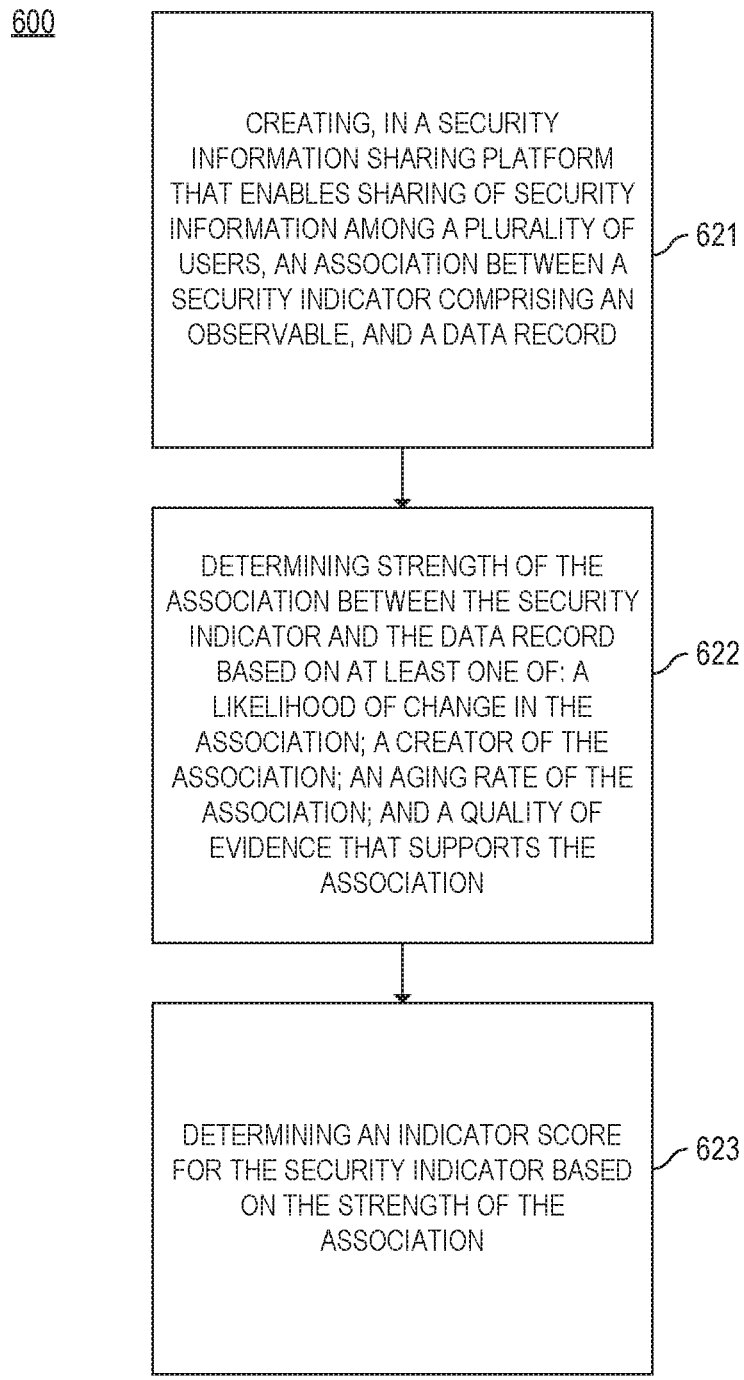
FIG. 6 is a flow diagram depicting an example method for determining strength of associations among data records in a security information sharing platform.

FIG. 6 is a flow diagram depicting an example method 600 for determining strength of associations among data records in a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include creating, in a security information sharing platform that enables sharing of security information among a plurality of users, an association between a security indicator comprising an observable, and a data record. Referring back to FIG. 1, association engine 121 may be responsible for implementing block 621.

In block 622, method 600 may include determining strength of the association between the security indicator and the data record based on at least one of: a likelihood of change in the association; a creator of the association; an aging rate of the association; or a quality of evidence that supports the association. Referring back to FIG. 1, association engine 121 may be responsible for implementing block 622.

In block 623, method 600 may include determining an indicator score for the security indicator based on the strength of the association. Referring back to FIG. 1, indicator score engine 122 may be responsible for implementing block 623.

The foregoing disclosure describes a number of example implementations for determining strength of associations among data records in a security information sharing platform. The disclosed examples may include systems, devices, computer-readable storage media, and methods for determining associations among data records in a security information sharing platform. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for determining strengths of associations among data records in a security information sharing platform, the method comprising:
   creating, by the security information sharing platform that enables sharing of security information among a plurality of users, a first association between a first security indicator comprising an observable, and a first data record, the first association representing a relationship between the observable and the first data record;
   determining, by the security information sharing platform, a strength of the first association between the first security indicator and the first data record based on a plurality of parameters, the plurality of parameters comprising: a parameter indicating a likelihood of change in the first association; a parameter indicating an aging rate of the first association; and a parameter indicating a quality of evidence that supports the first association; and
   providing, by the security information sharing platform, a user interface comprising a visual representation of the created first association, the visual representation comprising an indication of the determined strength of the first association between the first security indicator and the first data record.

2. The method of claim 1, wherein the first data record represents at least one of: an organization, an industry sector, a geography, a community of the security information sharing platform, a domain name, or a threat actor.

3. The method of claim 1, further comprising:
determining, by the security information sharing platform, an indicator score for the first security indicator based on the strength of the first association.

4. The method of claim 1, further comprising:
determining, by the security information sharing platform, a first hash value for the first data record and a second hash value for a second data record;
in response to determining that the first hash value and the second hash value are identical, creating, by the security information sharing platform, a second association between the first data record and the second data record; and
determining, by the security information sharing platform, the quality of evidence that supports the second association based on the evidence that the first hash value and the second hash value are identical.

5. The method of claim 4, further comprising:
determining, by the security information sharing platform, an indicator score for the first security indicator based on the strength of the second association.

6. The method of claim 1, wherein the aging rate indicates a rate of reduction in the strength of the first association over a time period, the method further comprising:
applying, by the security information sharing platform, the aging rate to the strength of the first association if the time period has passed since the creation of the first association.

7. The method of claim 1, further comprising:
obtaining, by the security information sharing platform, from a first source entity associated with the first data record, a first sighting of the observable, the first sighting of the observable indicating that the observable has been observed by the first source entity;
obtaining, by the security information sharing platform, from a second source entity associated with the first data record, a second sighting of the observable, the second sighting of the observable indicating that the observable has been observed by the second source entity;
determining, by the security information sharing platform, a number of sightings of the observable, the sightings of the observable including the first and second sightings of the observable; and
creating, by the security information sharing platform, in the security information sharing platform, the first association based on the number of sightings of the observable.

8. A non-transitory machine-readable storage medium comprising instructions executable by a processor of a computing device for determining strength of associations among data records in a security information sharing platform, the non-transitory machine-readable storage medium comprising:
instructions to determine, by the security information sharing platform, that a first observable is associated with a second observable, a threat actor, a malware, a chain of attack, an organization, an industry sector, a community of the security information sharing platform, a domain name, and any combination thereof;
instructions to identify, by the security information sharing platform, a first data record that corresponds to the second observable, the threat actor, the malware, the chain of attack, the organization, the industry sector, the community, the domain name, and any combination thereof;
instructions to create, by the security information sharing platform, a first association between a first security indicator comprising the first observable and the first data record, the first association representing a relationship between the first observable and the first data record;
instructions to determine, by the security information sharing platform, a strength of the first association based on a plurality of parameters, the plurality of parameters comprising: a parameter indicating a likelihood of change in the first association over time; a parameter indicating an aging rate of the first association; and a parameter indicating a quality of evidence that supports the first association; and
instructions to provide, by the security information sharing platform, a user interface comprising a visual representation of the created first association, the visual representation comprising an indication of the determined strength of the first association between the first security indicator and the first data record.

9. The non-transitory machine-readable storage medium of claim 8, further comprising:
instructions to create, by the security information sharing platform, a second association between a second data record and a third data record;
instructions to determine, by the security information sharing platform, strength of the second association based on a plurality of parameters, the plurality of parameters comprising: a parameter indicating a likelihood of change in the second association over time; a parameter indicating an aging rate of the second association; and a parameter indicating a quality of evidence that supports the second association;
instructions to determine, by the security information sharing platform, based on the parameter indicating the likelihood of change for the first association and the parameter indicating a likelihood of change for the second association, that the first association is less likely to change over time than the second association; and
instructions to increase, by the security information sharing platform, the strength of the first association by a higher percentage than the strength of the second association.

10. The non-transitory machine-readable storage medium of claim 8, further comprising:
instructions to determine, by the security information sharing platform, an indicator score for the first security indicator based on the strength of the first association.

11. The non-transitory machine-readable storage medium of claim 8, further comprising:
instructions to obtain, by the security information sharing platform, a search query that specifies the first security indicator; and
in response to the search query, instructions to provide, by the security information sharing platform, a set of data records associated with the first security indicator, the set of data records including the first data record.

12. The non-transitory machine-readable storage medium of claim 11, further comprising:
instructions to identify, by the security information sharing platform, a second security indicator that is associated with the first data record; and
instructions to provide, by the security information sharing platform, the second security indicator in response to the search query.

13. A system comprising:
a processor; and
a memory coupled with and readable by the processor and storing therein a set of instructions which, when executed by the processor, causes the processor to determine strength associations among data records in a security information sharing platform by:
creating, in the security information sharing platform that enables sharing of security information among a plurality of users, a first association between a first data record comprising a first security indicator, and a second data record, the first association representing a relationship between the first data record and the second data record;
determining a strength of the first association between the first data record and the second data record based on a plurality of parameters, the plurality of parameters comprising: a parameter indicating a likelihood of change in the first association over time; a parameter indicating an aging rate of the first association; and a parameter indicating a quality of evidence that supports the first association;
determining an indicator score for the first data record based on the strength of the first association between the first data record and the second data record; and
providing a user interface comprising a visual representation of the created association, the visual representation comprising an indication of the determined strength of the first association between the first data record and the second data record.

14. The system of claim 13, wherein the security indicator comprises an observable, and wherein the instructions further cause the processor to:
determine the indicator score for the first data record based on at least one of: a severity of a security threat posed by the security indicator, a number of sightings of the observable, a reliability of a source entity for the security indicator, or user feedback indicating whether the security indicator is accurate submitted by users of the security information sharing platform.

15. The system of claim 13, wherein the instructions further cause the processor to:
determine a first hash value for the first data record and a second hash value for a second data record;
in response to determining that the first hash value and the second hash value are identical, create a second association between the first data record and the second data record; and
determine the quality of evidence that supports the second association based on the evidence that the first hash value and the second hash value are identical.

16. The system of claim 15, wherein the instructions further cause the processor to:
determine the indicator score for the first security indicator based on the strength of the second association.

17. The system of claim 13, wherein the aging rate indicates a rate of reduction in the strength of the first association over a time period and wherein the instructions further cause the processor to:
apply the aging rate to the strength of the first association if the time period has passed since the creation of the first association.

18. The system of claim 13, wherein the instructions further cause the processor to:
obtain, from a first source entity associated with the first data record, a first sighting of the first observable, the first sighting of the first observable indicating that the first observable has been observed by the first source entity;
obtain, from a second source entity associated with the first data record, a second sighting of the first observable, the second sighting of the first observable indicating that the first observable has been observed by the second source entity;
determine a number of sightings of the first observable, the sightings of the first observable including the first and second sightings of the first observable; and
create, in the security information sharing platform, the first association based on the number of sightings of the first observable.

19. The system of claim 13, wherein the instructions further cause the processor to:
create, in the security information sharing platform, a second association between the second data record and a third data record;
determine, based on the parameter indicating the likelihood of change for the first association and a parameter indicating a likelihood of change for the second association, that the association between the first data record and the second data record is less likely to change over time than the association between the second data record and the third data record; and
increase the strength of the association between the first data record and the second data record by a higher percentage than the strength of the association between the second data record and the third data record.

20. The system of claim 13, wherein the instructions further cause the processor to:
obtain a search query that specifies the first security indicator; and
in response to the search query, provide a set of data records associated with the first security indicator, the set of data records including the first data record.

* * * * *